United States Patent [19]

Charpentier et al.

[11] Patent Number: 5,335,006
[45] Date of Patent: Aug. 2, 1994

[54] METHOD AND DEVICE FOR TRANSMITTING VIDEO SIGNALS IN CONFINED SPACES

[75] Inventors: Dominique Charpentier, Montataire; Pierre DeGaugue, Lambersart; Daniel Degardin, Fletre; Jacques Baudet, Villeneuve D'Asco, all of France

[73] Assignee: Charbonnages De France, Rueil Malmaison, France

[21] Appl. No.: 859,421
[22] PCT Filed: Dec. 7, 1990
[86] PCT No.: PCT/FR90/00893
§ 371 Date: May 26, 1992
§ 102(e) Date: May 26, 1992
[87] PCT Pub. No.: WO91/09502
PCT Pub. Date: Jun. 27, 1991

[30] Foreign Application Priority Data

Dec. 8, 1989 [FR] France .................. 89 16304

[51] Int. Cl.⁵ ........................................... H04N 7/18
[52] U.S. Cl. ........................ 348/82; 348/726; 348/192
[58] Field of Search .............. 358/108, 141, 83, 100, 358/23; 455/277.1, 277.2

[56] References Cited

U.S. PATENT DOCUMENTS 4,584,713 4/1986 Brackert et al. .............. 455/277.2
4,831,438 5/1989 Bellman, Jr. et al. .............. 358/108
4,977,616 12/1990 Linder et al. .................... 455/277.2
5,128,755 7/1992 Faucher ........................... 358/108

FOREIGN PATENT DOCUMENTS 2626925 12/1977 Fed. Rep. of Germany .

OTHER PUBLICATIONS

Siemens Review, vol. XLI, 1974, H. Panschar et al., pp. 180–184.
Funkschau, vol. 51, No. 3, Feb. 1979, pp. 72–74.
Patent Abstracts of Japan, vol. 8, No. 25 Feb. '84.

Primary Examiner—Victor R. Kostak
Attorney, Agent, or Firm—Remy J. VanOphem

[57] ABSTRACT

A UHF carrier signal modulated by a video signal, where the frequency and the format of a line synchronization signal are known, is transmitted in a transmission region in a confined medium by a microwave link. In a reception region, two signals are received along two angularly offset privileged axes, each is frequency-demodulated along identical processing channels, the existence in the signal emitted from one of the channels, the "starting channel", of a periodic signal with the line synchronization frequency is checked and this signal is selected if the check proves positive. If the periodic signal disappears, the test is applied to the other channel; if that check is positive, this other channel is selected until this periodic signal disappears. Such a process is especially applicable in tunnels.

34 Claims, 10 Drawing Sheets

METHOD AND DEVICE FOR TRANSMITTING VIDEO SIGNALS IN CONFINED SPACES

BACKGROUND OF THE INVENTION

The invention concerns the transmission of video signals in confined spaces such as tunnels and mines.

Video transmission is used in systems for remote surveillance of the environment or of a mobile plant moving in an ill-defined environment subject to interference, with the aim of viewing and guiding or controlling mobile plants; one particular example is the high data rate, analog transmission of information and telecontrol signals to a machine in a mine tunnel, a drainage tunnel or, more generally, any tunnel with a diameter in the order of 1 to 10 meters.

Until now video signals have been transmitted in tunnels for broadband communications between the mobile plant and a fixed (or at least temporarily fixed) equipment in the tunnel using radiating structures; these might be coaxial cables operating in the 200-900 MHz frequency band, for example, or microwave waveguides radiating frequencies above 1 GHz. In this way it is possible to secure continuous transmission between a mobile transmitter moving near the waveguide and a receiver at the end of the waveguide. A communication system of this kind is bidirectional as the waveguide can also be used for transmission from the fixed equipment carrying the receiver to the mobile plant carrying the transmitter.

These known systems have the disadvantage that the mobile plant is required to remain in the immediate vicinity of the waveguide (within about 1 meter) if the benefits of the homogeneity of the field are to be obtained. More importantly, these systems have the major disadvantage of requiring the installation of radiating strutures representing a costly infrastructure. The transmission system is, therefore, a fixed system devoid of any flexibility for future adaptation.

The invention is directed to alleviating these disadvantages by providing a microwave video transmission system establishing continuous communication with mobile plants at any position in a tunnel, the communication quality being good at all times in spite of fluctuations in the received signal resulting from the numerous reflections from the tunnel walls and from the usual presence of metal obstacles between the transmitter and the receiver and attenuation due to bends or branches in the tunnel.

SUMMARY OF THE INVENTION

To this end the invention proposes a method for transmission in a confined space between mobile or fixed transmit and receive areas of a video signal formed by a succession of video picture line signals beginning with a known format synchronization signal of known period representing a known line synchronization frequency. In the transmit area the video signal modulates a carrier signal at a frequency in the microwave band, the modulated carrier is transmitted on a microwave link to the receive area, in the receive area two signals are received on two angularly offset privileged axes, the received signals are demodulated in respective identical processing channels, the demodulated received signal from a predetermined initial channel is intially applied to picture forming equipment for as long as there is detected in it the presence of a periodic signal with a frequency equal to the video line synchronization frequency, and the channel is changed when this periodic signal is no longer present on this channel but is detected on the other channel, and so on.

The essential characteristic of the invention is, therefore, fast picture discrimination by testing for the presence of the synchronization signal line or over a predetermined number of lines or frame by frame. This produces a clear enhancement of the picture reconstituted from the signals received in the receiving area. Even if there are significant fluctuations, given the very short response time (response time of one line to switch from one channel to the other), under no circumstances can more than a few lines be lost, which in practice may be imperceptible. This is much better than discrimination based on comparing the amplitudes of signals on the two channels.

This low sensitivity to fluctuations is further enhanced by the angular offset between the axes on which the signals are captured for the two processing channels.

According to preferred features of this method if at a given time no periodic signal at a frequency equal to the video line synchronization frequency is detected in the signal applied to the picture forming equipment or in the other signal, the signal selected until this time continues to be selected.

If at a given time at least one periodic signal with a frequency equal to the synchronization frequency is detected in either demodulated received signal, the output signal from the channel producing the better picture is applied to the picture forming equipment.

Switching to the better channel is commanded immediately on receiving an indication of detection of the first next line or first next frame synchronization signal.

Alternatively, if at a given time no periodic signal with a frequency equal to the synchronization frequency is detected in either demodulated received signal, the output signal from the initial channel is applied to the picture forming equipment.

The carrier frequency is between 1 and 31 GHz, preferably between 1 and 10 GHz, and more preferably the carrier frequency is approximately 2.5 GHz. The confined space is a tunnel extending along an axis and the signals transmitted and received are electrically polarized parallel to the axis.

The angular offset between the privileged axes is fixed or variable and between 15° and 45°, and preferably the offset is approximately 20°.

The confined space is a tunnel and the privileged axes are offset transversely to the tunnel.

To demodulate the signals received on each of the two channels, the signals are mixed with a demodulator microwave signal at a frequency differing from the carrier frequency by a value representing an intermediate frequency between 30 and 300 MHz, and the mixed signals obtained in this way on each channel are low-pass filtered to attenuate in the spectrum of the mixed signals spikes corresponding to the microwave frequencies of the carrier and of the demodulator signal.

For implementing the method, the invention also proposes a transmission device composed of a transmitter and a receiver adapted to transmit in a confined space a video signal formed by a succession of video picture line signals beginning with a known format synchronization signal with a known period representing a known line synchronization frequency. The transmitter is a microwave oscillator generating a carrier signal to an input of which the video signal is applied as a modulator signal, a microwave amplifier connected to the output of the oscillator and a transmitter antenna connected to the output of the microwave amplifier. The receiver is constituted by two receive antennas with radiation patterns defining angularly offset privileged axes, two demodulator channels connected to the output of these antennas, and a processing stage including a validation stage and a channel switching circuit adapted to supply at the output the demodulated signal from one or other of the channels. The validation stage is adapted to test for the presence in either signal from the two channels of a signal at the known line synchronization frequency and, in the absence of either of them, to command switching between the channels by the channel switching circuit to the channel carrying the synchronization signal.

According to preferred features of this device the validation stage has a validation circuit for each channel.

The validation stage is adapted to test for the presence of a signal at a known frame synchronization frequency. An analyzer circuit commands channel switching at the frame synchronization time or at the line synchronization time as selected by the user.

The analyzer circuit commands channel switching only if the other channel is better than the current channel in the case of switching at the frame synchronization time and in the case of switching at the line synchronization time switches channels only if both channels are good simultaneously or both channels are bad simultaneously.

The synchronization signal extractor and switching circuit sets only one of the two channels if synchronization signals are present on that channel, the respective signal is applied to the picture forming device. If synchronization signals are absent on the same channel, the switch selects the other channel which is applied to the picture forming device in the presence of synchronization signals; otherwise the switch reverts to the previous channel.

The validation stage is connected to the output of each of the two channels and to two inputs of the channel switching circuit and to two terminals of the latter.

The microwave oscillator oscillates at a frequency between 1 and 30 GHz, preferably between 1 and 10 GHz, and more preferably the frequency of the microwave oscillator is approximately 2.5 GHz.

The receive antennas are identical linear polarization microstrip antennas disposed in angularly offset planes.

The confined space is a tunnel extending along an axis and the antennas are polarized parallel to the larger transverse dimension of the tunnel.

The device constitutes a plane metal reflector in a bend or a branch of the tunnel.

The transmitter includes a camera producing the video signal to be transmitted.

The receiver and/or the transmitter is/are mobile.

The receive antennas are angularly offset by a fixed or variable angle between 15° and 45°.

The receive antennas are angularly offset by an angle of approximately 20°.

The confined space is a tunnel extending along an axis and the transmit antenna and one of the receive antennas are oriented perpendicular to the axis.

Each channel of the receiver is a low-noise microwave amplifier, a mixer receiving the same demodulator signal at a microwave frequency differing from the frequency of the oscillator of the receiver by an amount representing an intermediate frequency between 30 and 300 MHz, a low-pass filter tuned to this intermediate frequency, and a frequency demodulator.

The frequency demodulator includes a signal compressor stage and a phase-locked loop demodulation stage.

The receiver is a demodulation oscillator connected to a power divider connected to the mixer of each channel.

Objects, characteristics and advantages of the invention will emerge from the following description given by way of non-limiting example with reference to the appended drawings.

DETAILED DESCRIPTION OF THE PREFERRED EMBODIMENT

Figure 1:
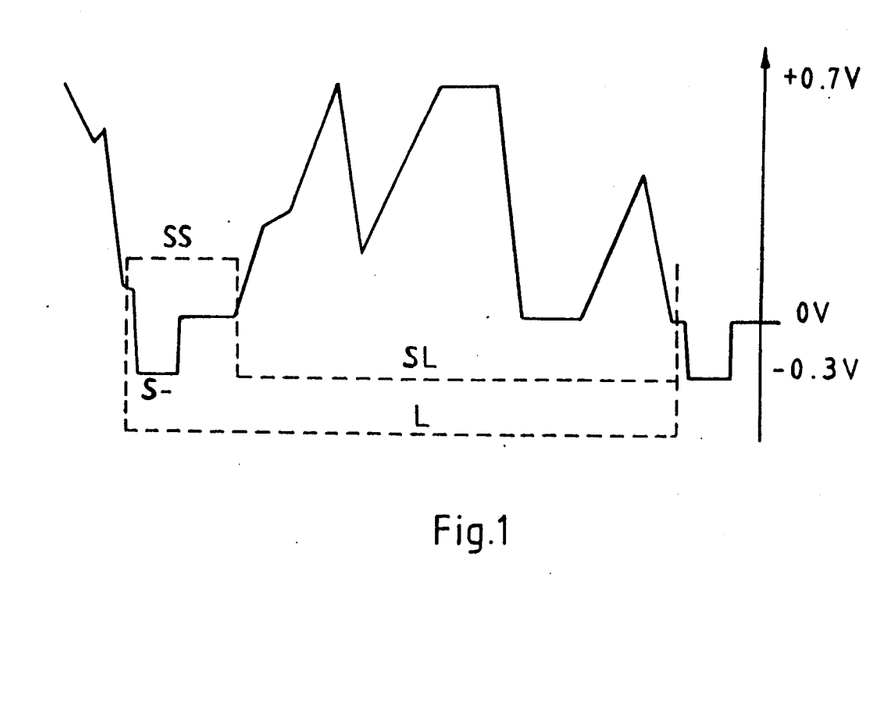
FIG. 1 is a schematic representation of the signal associated with one line of a picture to be transmitted.

FIG. 1 is a schematic representation of one line of a black and white video picture.

In this conventional example, each line L has a duration of 64 μs and begins with a synchronization signal SS followed by a line information signal SL. The synchronization signal is a squarewave signal in the form of a negative signal S− of predetermined duration (for example 4.7 μs) followed by null signal. The line information signal is an analog signal whose amplitude (voltage) varies between a minimum (maximum black) level (0 V) and a maximum (maximum white) level (+0.7 V); here the duration of the signal SL is 54 μs.

A complete picture is formed on a large number of lines (for example 625 lines); this number is determined by the picture source (camera).

Figure 2:
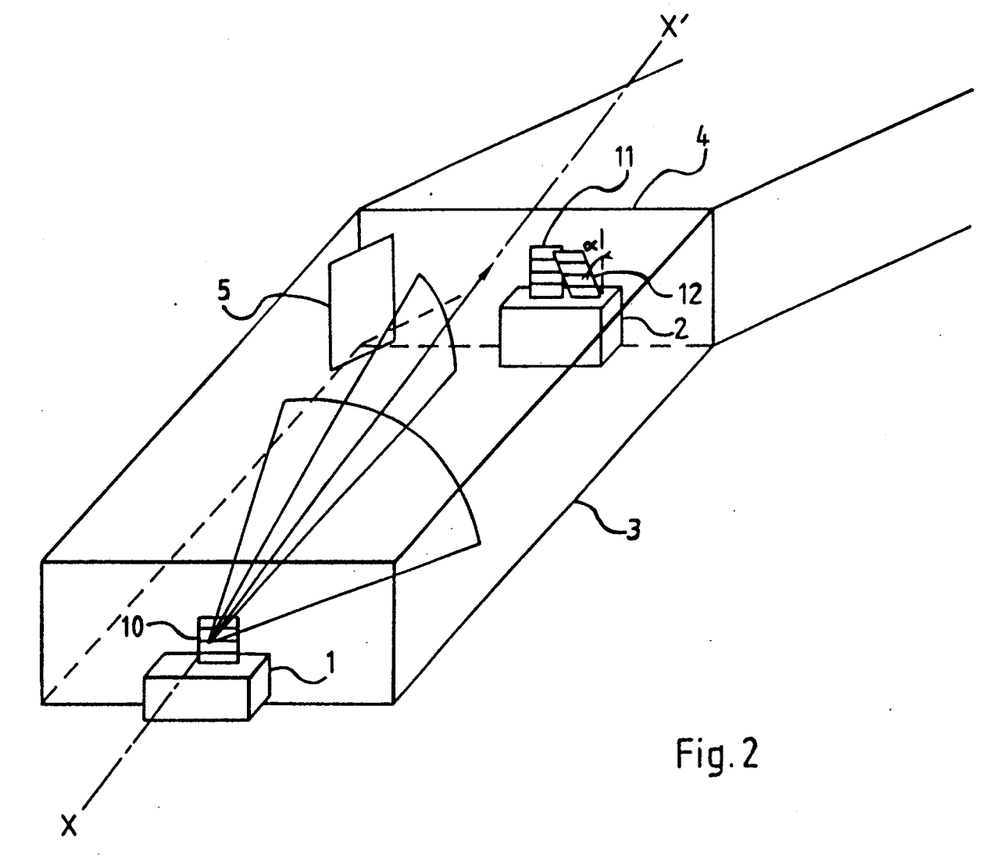
FIG. 2 is a schematic representation of a transmitter-receiver system in accordance with the invention installed in a tunnel.

In accordance with the invention a picture is transmitted from a transmitter 1 to a receiver 2 using a microwave link at a frequency between 1 and 30 GHz. In this example the transmitter 1 is mobile and the receiver 2 is fixed.

The tunnel may be regarded as an overdimensioned waveguide with rough walls; it will usually be wider than its height (for example 4 m × 2.5 m). A statistical study of this transmission "channel" provides an evaluation of two parameters; namely the attenuation and the fluctuation density. By using a microwave beam at a frequency of approximately 2.5 GHz it is possible to achieve a range exceeding 100 meters, the transmitted picture being of good quality in spite of the large number of instances of signal fading. A bend or a branch 4 in the tunnel strongly attenuates the received signal but the attenuation can be significantly reduced if a plane reflector 5, for example a stainless steel plate 2 m×2 m or any other passive reflector, is placed at the bend or branch. However, the invention is preferably applied to tunnels that are straight or have very large radii of curvature.

One aspect of the invention is the use of two receiving antennas very close together and the fact that decorrelation is achieved not by a high offset between the antennas but by the use of different radiation patterns.

The transmitter 1, which will be described in more detail later, has a single antenna 10 whereas, in accordance with this important aspect of the invention, the receiver 2 (which will also be described in more detail later) has two antennas 11 and 12 with an angular offset $\alpha$ (for example approximately 20°). This offset can be achieved either, as shown in FIG. 2, by using two identical antennas that are differently oriented or (not shown) by using two coplanar antennas whose radiation patterns have privileged axes at an angle $\alpha$. The latter case represents a more compact structure that is relatively simple to fabricate industrially. In the example shown, the antenna 11 is aligned with the axis X—X of the tunnel (or of the tunnel section in which the receiver 2 is located) and towards the receiver.

The antennas 10, 11 and 12 are advantageously identical. They are preferably linear polarization microstrip antennas, for example on any epoxy resin substrate 1.6 mm thick with a value $\epsilon r = 4.7$.

Figure 3:
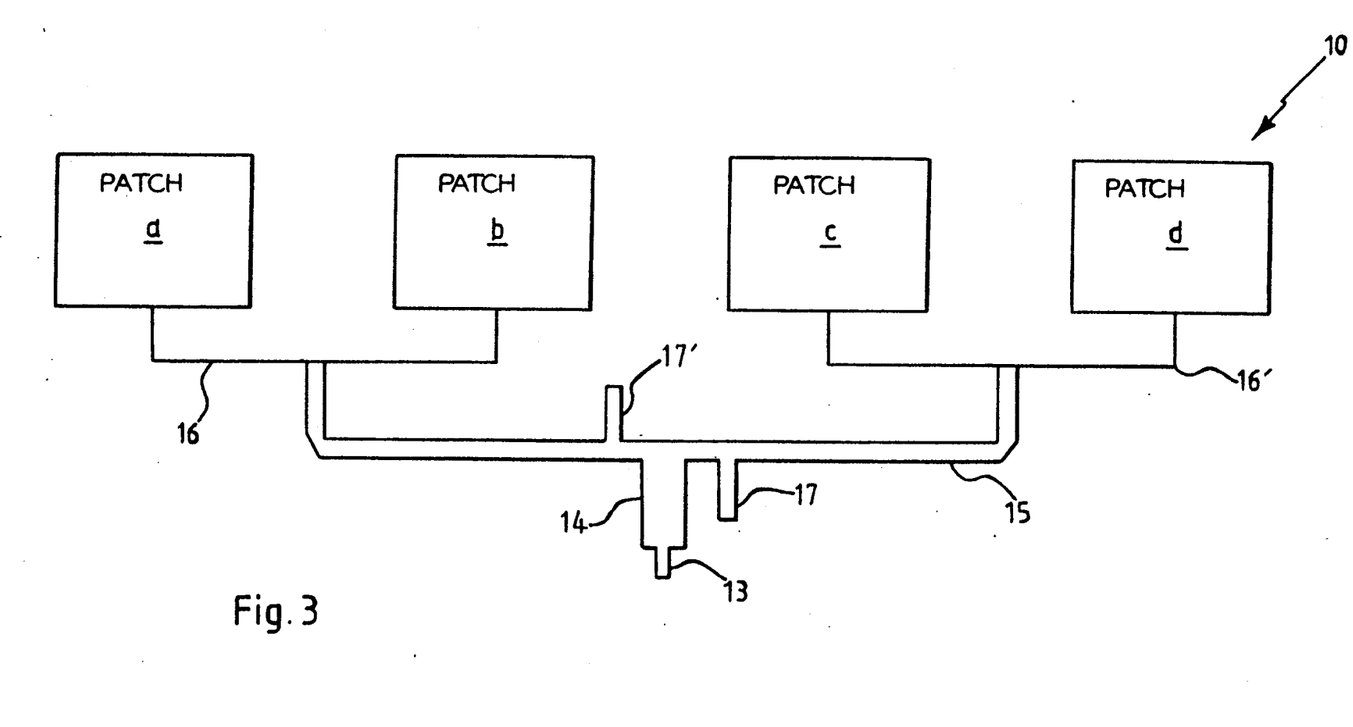
FIG. 3 is a schematic representation of an antenna suitable for both the transmitter and the receiver.

FIG. 3 is a schematic representation of the antenna 10, 11 or 12.

The antenna 10 has a plurality of known radiating "patches" a, b, c and d. Patches of this kind have been described by numerous writers, for example by I. J. BAHHL and P. BHARTHIA in "MICROSTRIP ANTENNAS" published by ARTECH HOUSE in 1980. Each patch has a thin strip radiating from the ends. Increasing the number of patches increases the gain of the antenna and determines its directional characteristics.

Research has shown that it is preferable to arrange the antenna so that it is polarized parallel to the larger dimension of the tunnel, as shown in FIG. 2.

In the FIG. 3 example, each patch has an impedance of 100 ohms at the center. To match the four patches to 50 ohms an impedance matching section 14 with an impedance of 35 ohms is provided between the input 13 and a strip 15 connected to each pair of patches a and b, c and d. The patches in each pair are connected by a strip 16 or 16'. Matching stubs 17 or 17' are provided to eliminate the imaginary part of the input impdedance of the antenna. To give one specific example, the respective widths of the strips 14, 15 and 16 or 16' are 5 mm, 2.8 mm and 1 mm and the patches are 35 mm×27 mm.

In this example with four patches (spaced in the vertical plane by half the carrier wavelength), the half-power aperture of the antenna 10, as measured in an anechoic chamber, is approximately 20°-25° in the vertical plane and 65°-70° in the horizontal plane.

It has been found that an antenna of this kind has a bandwidth of 38 MHz at a frequency of around 2.51 GHz for a standing wave ratio (SWR) of 1.2; this wide bandwidth explains the carrier frequency chosen in this embodiment. This makes it possible to transmit several camera (television) channels, a channel occupying approximately 6 MHz of bandwidth.

Figure 4:
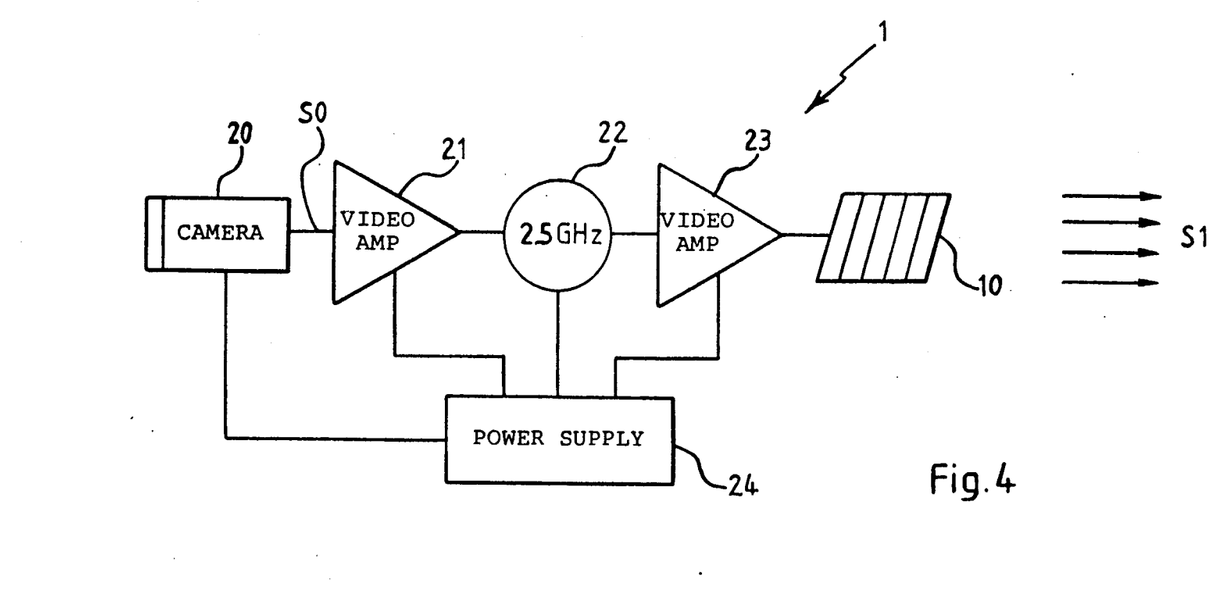
FIG. 4 is a block diagram showing the general principle of the transmitter.

FIG. 4 is a block diagram of the transmitter 1.

The transmitter 1 has six modules, namely:
a charge-coupled device (CCD) camera 20,
a video amplifier 21 with a bandwidth of 6 MHz,
a microwave oscillator 22 set to the previously mentioned frequency of 2.5 GHz,
a microwave power amplifier 23 tuned to this frequency of 2.5 GHz,
a power supply circuit 24, and
the aforementioned antenna 10.

The camera 20 is, for example, a PHILIPS CTS 01 camera offering 604 lines×588 pixels in interlaced mode; its output signal is a composite video signal at a peak-to-peak level of 1 V across 75 ohms, drawing 200 mA for a 12 V supply and having a sensitivity of 0.05 lux.

The video amplifier 21 is optional; it is used if necessary to match the video signal from the camera 20 to the modulation input of the microwave oscillator 22. If this amplifier is included, it is matched to 75 ohms and produces an output signal at a level of 1 V (in compliance with the CCIR standard). Its bandwidth is 5 MHz.

The microwave oscillator 22 outputs a signal modulation by the video signal from the camera 20, after amplification by the video amplifier 21 if present. It is, for example, an A.D.E. ASY 2200–2500 programmable 2.5 GHz oscillator, drawing 200 mA from a 15 V supply and with an output power level of 10 dBm. A synthesized source of this kind is already used in broadcasting pictures from Formula 1 cars taking part in motor races, for example. The development of the antenna 10 has made it possible to adapt this particular microwave source to transmission in tunnels.

The microwave power amplifier 23 is, for example, a MITEQ AFD2-020040-25 P amplifier with a gain of 15 dB and an output power level of 25 dBm. It draws 380 mA from a 15 V supply.

The transmit power rating of the antenna 10 is 300 mW.

To make the transmitter 1 portable the power supply circuit 24 has been integrated into it. It has a 12 V, 6.5 Ah battery and a 12 V–15 V DC-DC converter rated 800 mA for powering the modules 22 and 23. Each of the modules 20 through 23 is preferably powered via a DC-DC converter enabling the ground circuits of these modules to be isolated from the battery ground. A test circuit is included to disconnect the power supply from these modules if the battery is fully discharged. A constant current charger system is advantageously integrated into the power supply unit. The theory and the construction of the various previously mentioned components of the power supply unit are known in themselves and those skilled in the art will know how to assemble them to produce this unit. There is therefore no need to describe this unit in more detail.

S1 denotes the signal radiated by the antenna 10.

Figure 5:
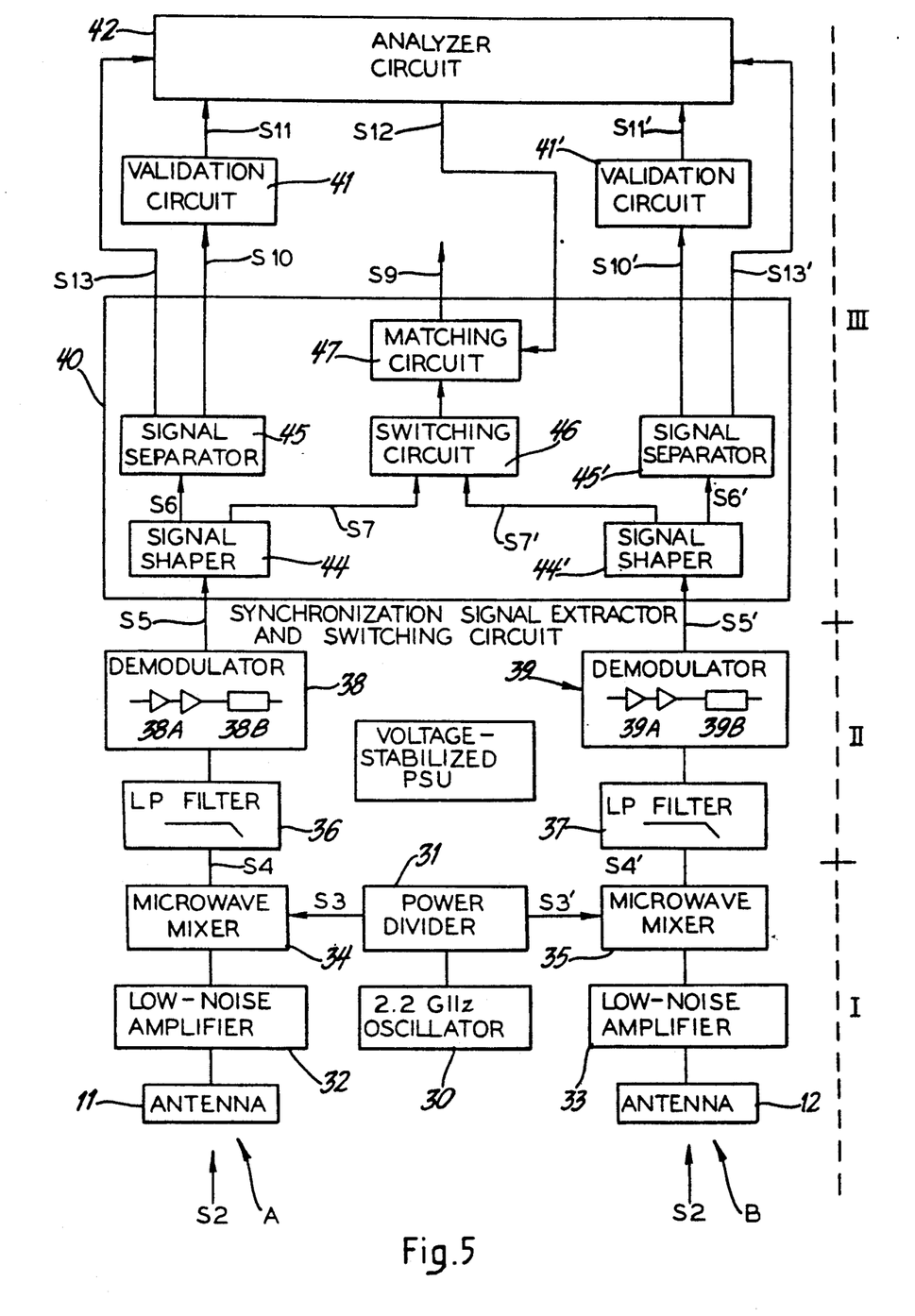
FIG. 5 is a block diagram showing the general principle of the receiver.

FIG. 5 shows the general structure of the receiver 2.

As previously mentioned, the receiver includes two antennas 11 and 12 differing only in terms of their priviledged receive direction. The signals captured by these antennas are denoted S2 and S2'.

Another possiblity is to use two antennas spaced by at least ten times the carrier wavelength to achieve good decorrelation of the signals received by these antennas, but this significantly increases the overall size (to approximately 1.2 m).

The two antennas provide the input to two identical and parallel channels A and B terminating at a synchronization signal extractor and channel switching circuit 40 (discriminator and switching circuit, for short).

The receiver 2 has a microwave part I, an intermediate frequency part II and a digital and low-frequency electronic part III.

The microwave part includes a local oscillator 30 and a power divider 31 and, on each of the channels A and B, the antenna 11 or 12, a low-noise amplifier 32 or 33 and a microwave mixer 34 or 35 connected to the local oscillator 30 by the power divider 31.

The low-noise amplifiers 32 and 33 are vital components of the receiver 2 as they determine its sensitivity. This sensitivity is limited by the thermal noise performance of the receiver. Each amplifier is, for example, a MITEQ AFD3-024026-18 microwave amplifier with a gain of 30 dB, a noise factor of 1.8 dB in the 2.4–2.6 GHz band and an output power level of 10 dBm; it draws 108 mA from a 15 V supply.

The ideal for these (identical) amplifiers is to combine low noise with as much compression as possible.

The local oscillator 30 generates a microwave signal to be divided between the two channels with a power level of the same order of magnitude as the output signals of the low-noise amplifiers 32 and 33 and at a microwave frequency differing from that of the transmitted signal S1 by a value representing an intermediate frequency between a few tens and a few hundreds of megahertz, preferably between 30 and 300 MHz, upon which further processing is carried out. It is, for example, a MITEQ FAM series microwave oscillator, which is a phase-locked device with mechanical frequency adjustment; in this application the frequency of 2.2 GHz is chosen. Its output power level of 13 dBm is sufficient for the microwave mixers 34 and 35 to operate under good conditions following power division by the power divider 31.

The input and the two outputs of the power divider 40 are matched so that the output signals S3 and S3' applied to the microwave mixers are in phase and have the same amplitude, which is equal to half the input signal amplitude. This device is, for example, a WILKINSON divider as described, for example, in "Conception des Circuit Micro-Ondes" by T. C. EDWARDS published by MASSON in 1984. In this example the circuit is a 50 ohms line on an epoxy substrate which is split into two 75 ohms lines forming sections with a length equal to one quarter of the wavelength of the oscillator 30; this circuit therefore has a narrow bandwidth (around 10% or 200 MHz).

The mixers 34 and 35 feature low conversion loss and good isolation. They are, for example, HEWLETT PACKARD HMXR-5001 double-balanced broadband (2–12.4 GHz) mixers; the conversion loss is in the order of 8 dB at 2.5 GHz. The input standing wave ratio is relatively high. This module meets military specifications.

The output spectra of the mixers representing the product S4 or S4' of the signals from the low-noise amplifier 32 or 33 and from the 2.2 GHz local oscillator constitute components at 2.5 GHz and 2.2 GHz and at the difference frequency of approximately 300 MHz.

Further signal processing is carried out in the intermediate frequency part II of the receiver at the intermediate frequency.

The intermediate frequency part of the system has for each channel a low-pass filter 36 or 37 and a demodulator 38 or 39.

The filters 36 and 37 reject all frequencies at the mixer output except the intermediate frequency.

The filters have a good group delay time response. They are preferably based on a prototype fifth order BUTTERWORTH filter as described, for example, in "Filtre Actif" by P. BILSTEIN published by Editions Radio or in "Les micro-ondes" by R. BADOUAL published by MASSON, 1980. The cut-off frequency (at the −3 dB point) is 500 MHz and the attenuation at 1 GHz is 30 dB.

Each filter is in the form of an epoxy resin structure, making the design highly reproducible and necessitating no components. Three capacitors in series are formed by the printed circuit and the ground plane and two intermediate inductors are formed by the length of the propagation lines. A filter of this kind is symmetrical because it is odd ordered; it is matched to 50 ohms with losses of 2 dB.

The demodulators 38 and 39 have wide a dynamic range and a very fast response time. Demodulation using level compression has been adopted in preference to conventional demodulation using automatic gain control (AGC) because of the risk of oscillation in the intermediate frequency band in the latter case. The compression technique is well suited to high intermediate frequencies and yields a dynamic range of 60 dB with an extremely fast response time (the response time of a logarithmic amplifier can be in the order of 1 ns).

The structure chosen for the demodulator 38 or 39 depends on the intermediate frequency chosen and, therefore, on the oscillator frequency and vice versa. In the present example an intermediate frequency of 300 MHz has been chosen to enable use of conventional PLESSEY components in the FIG. 6 circuit.

Figure 6:
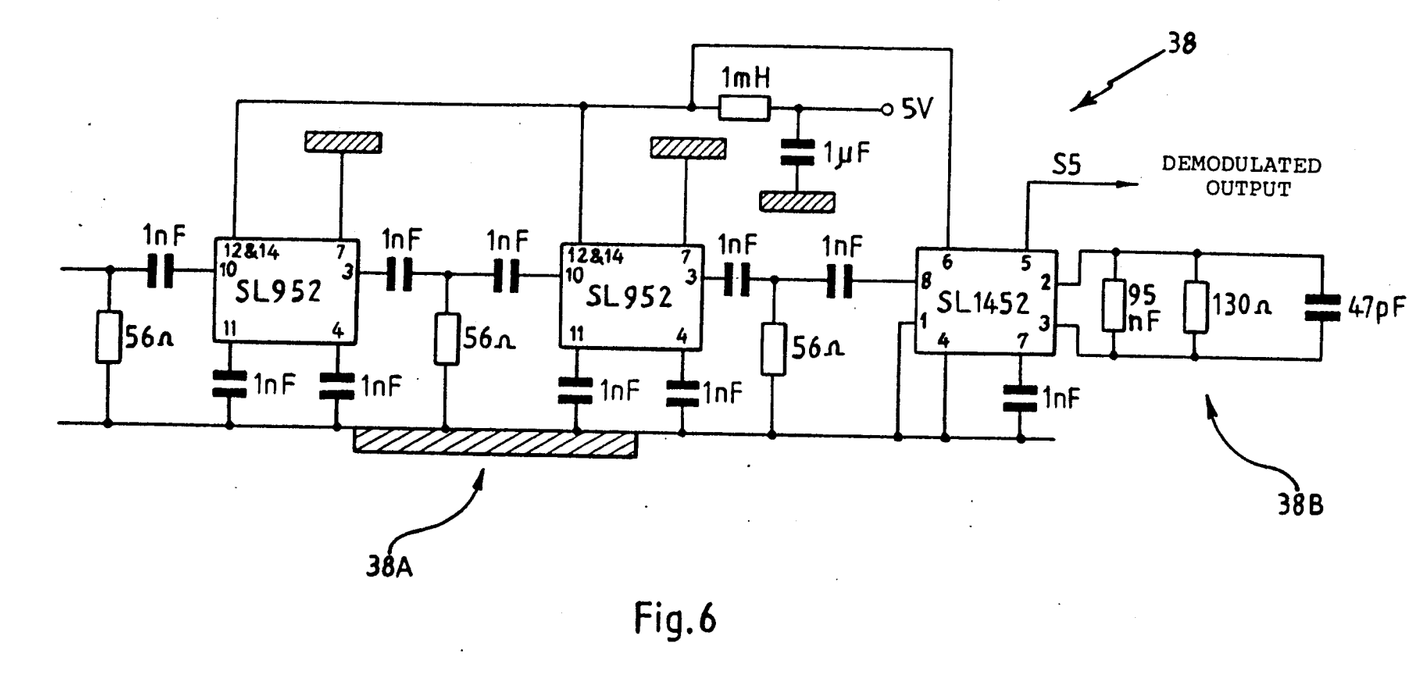
FIG. 6 shows the circuit of the demodulator in each channel of the receiver.

In more precise terms, the demodulator 38 (and the identical demodulator 39) include a signal compression stage 38A and a demodulator stage 38B.

The stage 38A (or 39A) constitutes two cascaded SL 952 limiter amplifiers.

The stage 38B (or 38A) includes the PLESSEY 1452 PLL which is easy to implement. A plug type resonator circuit including a 95 nF inductor completes this component. This circuit is tuned to 75 MHz, with Q=10.

The capacitors and the resistors are surface mount components.

The FIG. 6 circuit is tuned to 300 MHz and demodulates a signal at a level between −43 dBm (64 dB/μV) and 15 dBm, that is dynamic range inherent to the circuit of 58 dB.

The circuit draws 400 mA from a 5 V supply.

S5 and S5' denote the demodulator output signals.

Figure 7:
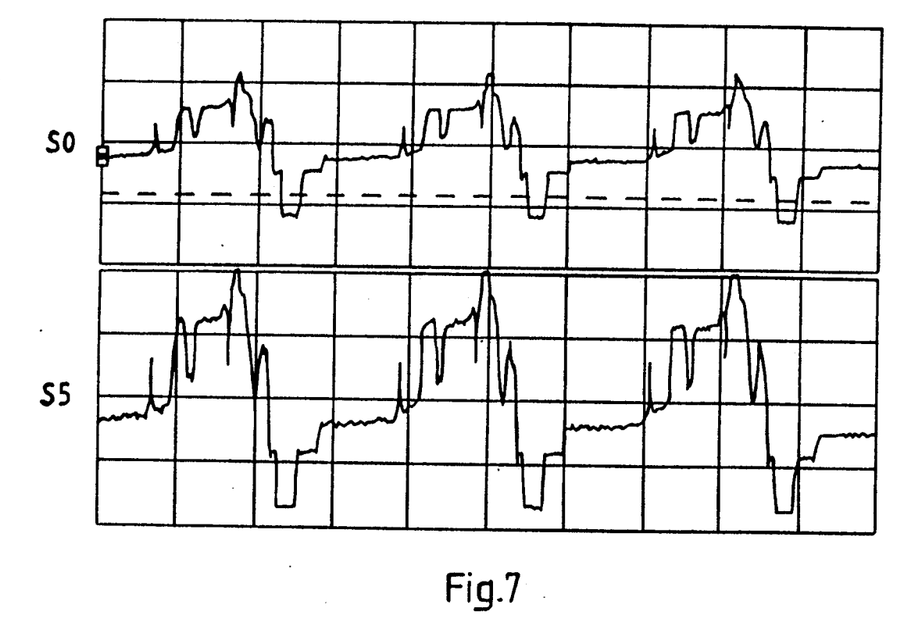
FIG. 7 shows a chart record comparing a portion of the video signal from the transmitter camera with the corresponding portion of the demodulated signal at the output of the demodulator from FIG. 6.

Referring to FIG. 7, comparing the output signal S0 from the camera 20 with the signal S5 shows the very accurate reconstitution by the demodulator circuit of the signal S0 direct from the camera 20.

The demodulated signals S5 and S5' from channels A and B are applied to the digital/low frequency part III of the receiver which is designed to optimize the formation of a picture from these signals by using an appropriate discrimination test to attenuate the effects of any temporary fading of either signal.

The digital/low frequency part III includes the discriminator and switching circuit 40 (including a synchronization signal shaping stage and splitter circuit for each of the signals S5 and S5' and a matching circuit for the selected channel), two validation circuits 41 and 41' which respectively test the signal S6 and the signal S6' for the presence of synchronization signals; each validation circuit sends the good or bad operation indication (S11 and S11') to an analyzer circuit 42 which acts on the results of the tests to send the signal from one channel (signal S9) to a picture forming device (not shown).

According to the invention, each validation circuit tests for the presence of the line synchronization signal at the beginning of each line.

In this example the signals S5 and S5' from the demodulators on channels A and B are reverse video signals with an amplitude of 200 mV and an offset of 2 V.

FIG. 5 is a schematic representation of the synchronization signal extractor and switching circuit 40. It has two signal shaping stages 44 and 44' in the form of the motorola MC 34 083 circuit, two line synchronization signals (S10, S10') and frame synchronization signal (S13, S13') separator stages 45 and 45' in the form of NATIONAL SEMICONDUCTOR LM 1881 circuits, a switching circuit 46 in the form of a NATIONAL SEMICONDUCTOR DG 303 which is comparable to an analog gate with an input controlled by the analyzer circuit, and a matching circuit 47 in the form of the NATIONAL SEMICONDUCTOR LM 1201 part.

The validation circuits 41 and 41' receive the line and picture synchronization signals S10 and S10' from the circuits 45 and 45'. Each validation circuit is controlled by an INTEL 80C31 microcontroller.

The validation circuits 41 and 41' use the combination of circuits 45 and 45' to test continuously for the presence of line synchronization signals in the signals S6 and S6' from the signal shaping circuits 44 and 44' and therefore in S5 and S5' (see FIG. 1).

Provided that these signals are present (at an interval of 64 μs in this example) the validation circuits indicate correct operation of the analyzer circuit by way of the signals S11 and S11'.

The analyzer circuit 42 is also controlled by an INTEL 80C31 microcontroller which receives the correct operation signals from the validation circuits 41 and 41' and the frame synchronization signals S13 and S13' from the separator circuits 45 and 45'. The analyzer circuit offers an optimized regime ("diversity") in which the objective is to adopt the better channel at all times.

The validation circuits and the analyzer circuit each include a 27 HC 128 ROM and a low address latch circuit in the form of the NATIONAL SEMICONDUCTOR 74 HC 273.

Each validation circuit tests continuously for the presence or absence of the line synchronization signals (S5 and S5') from each receive channel.

The analyzer circuit receives a signal per channel from the validation circuits. The states of these signals indicate good or bad reception on one or the other channel.

Priority is assigned a priori to one channel, for example channel A.

The analyzer circuits continuously test the signals from the validation circuits. Provided that the signals indicate good reception on both channels, the choice of channel A is retained.

If reception on channel A deteriorates, on the other hand, the system tests reception on channel B. If this is good, the analyzer circuit 42 commands the switching circuit to switch to channel B.

If reception is bad on both channels simultaneously, the analyzer circuit decides to remain on the channel that was used before reception deteriorated. Similarly, if reception is good on both channels simultaneously, the analyzer circuit does not command any further switching and remains on the channel originally chosen.

According to the invention, the criterion for discrimination is the line synchronization signal which is used to test the picture quality periodically. The circuit has a response time of one line and the signals S13 and S13' indicate to it the frame synchronization time. Two operating modes are therefore offered: switching at the start of frame synchronization or switching at the start of line synchronization.

Switching at the start of frame synchronization (and therefore every half-picture) is based on a knowledge of the number of bad lines on each channel. The system then switches to the channel on which there are less errors. The advantage of this solution is that it avoids constant switching between channels when the pictures are subject to high levels of interference.

Switching at the beginning of line synchronization means that the better channel can be selected very quickly and the channel selected is reviewed on each line synchronization.

It will be understood that the design of the receiver had involved the implementation of various modules as there is no commercially available diversity mode video receiver. It included two identical channels, an analyzer circuit and a channel switching circuit.

The validation and analyzer circuits are implemented using microcontrollers with the result that the software can be changed to modify the test time to adapt to different video standards and, if necessary, validation criteria.

Figure 8:
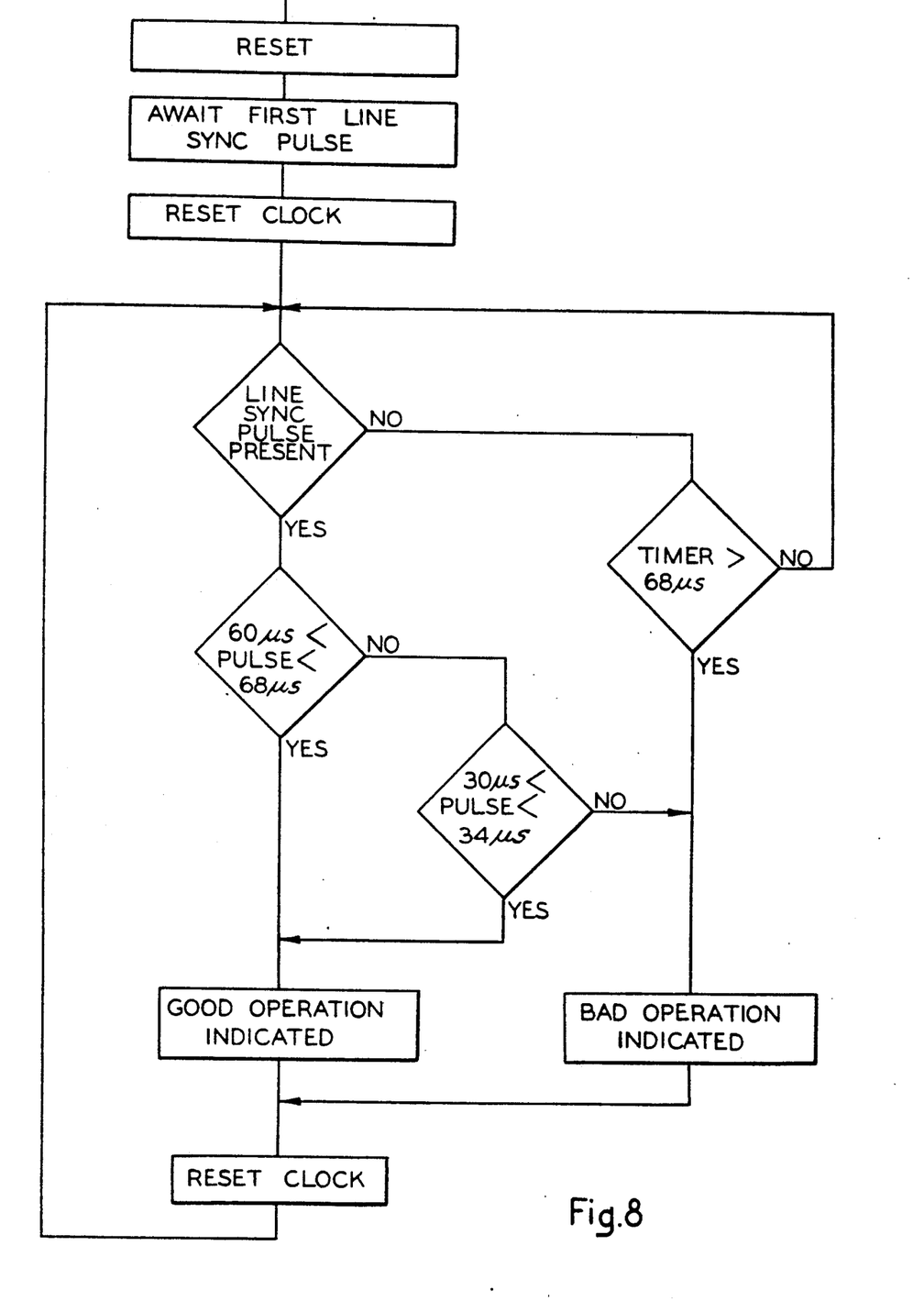
FIG. 8 is a flowchart of one of the validation circuits.

The algorithm of the validation circuit (FIG. 8) tests the synchronization signals line by line; numerous other picture quality criteria are equally feasible, based on a plurality of lines, for example.

Figure 9:
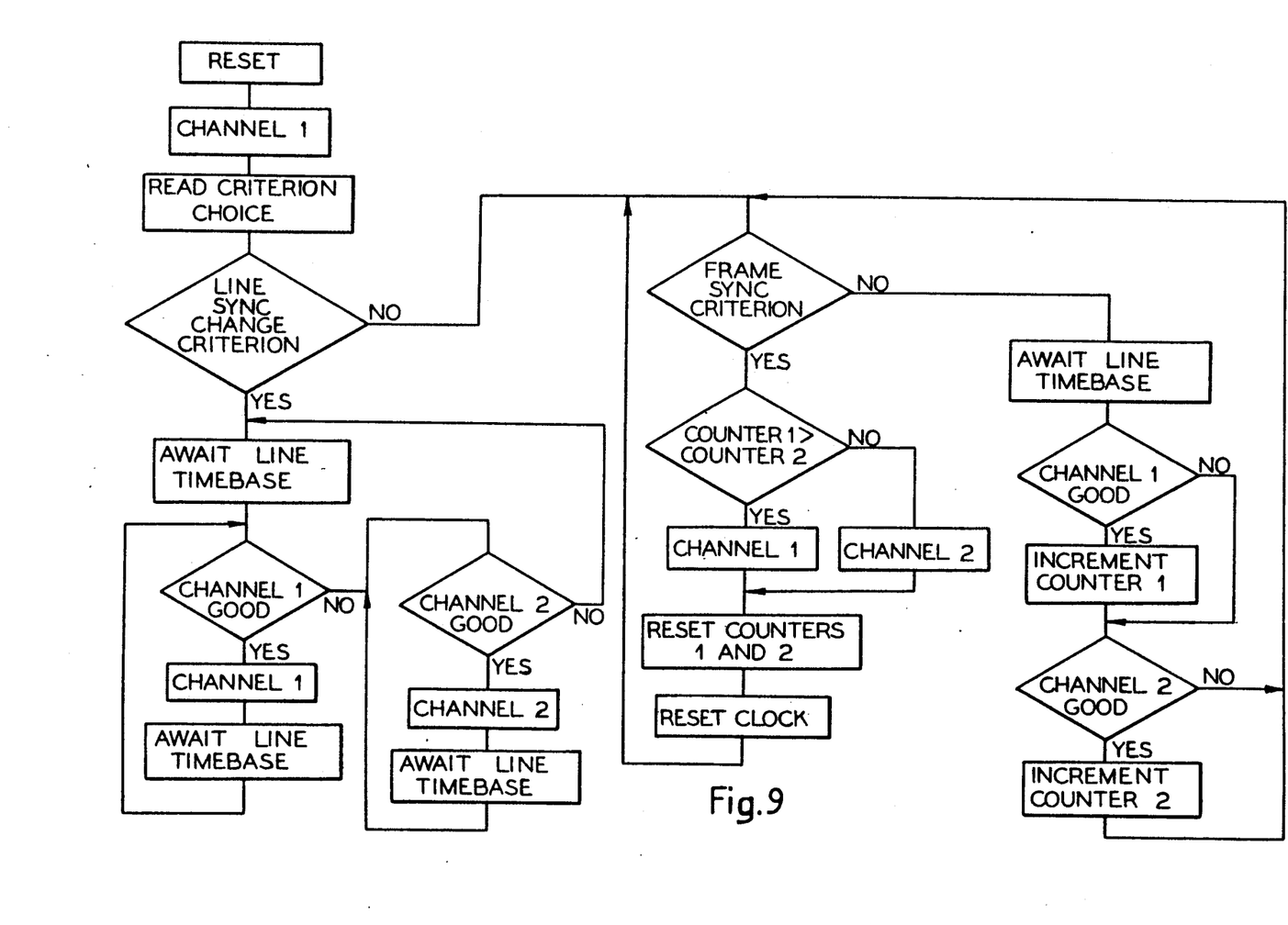
FIG. 9 is a flowchart of the analyzer circuit.

Likewise, the algorithm of the analyzer circuit (FIG. 9) controlling the picture forming device may switch at different stages of the picture sequence; for example, immediately when a line synchronization signal is formed (left-hand part) or at the beginning of the frame synchronization signal (right-hand part) or any other signal characterizing a picture.

Figure 10:
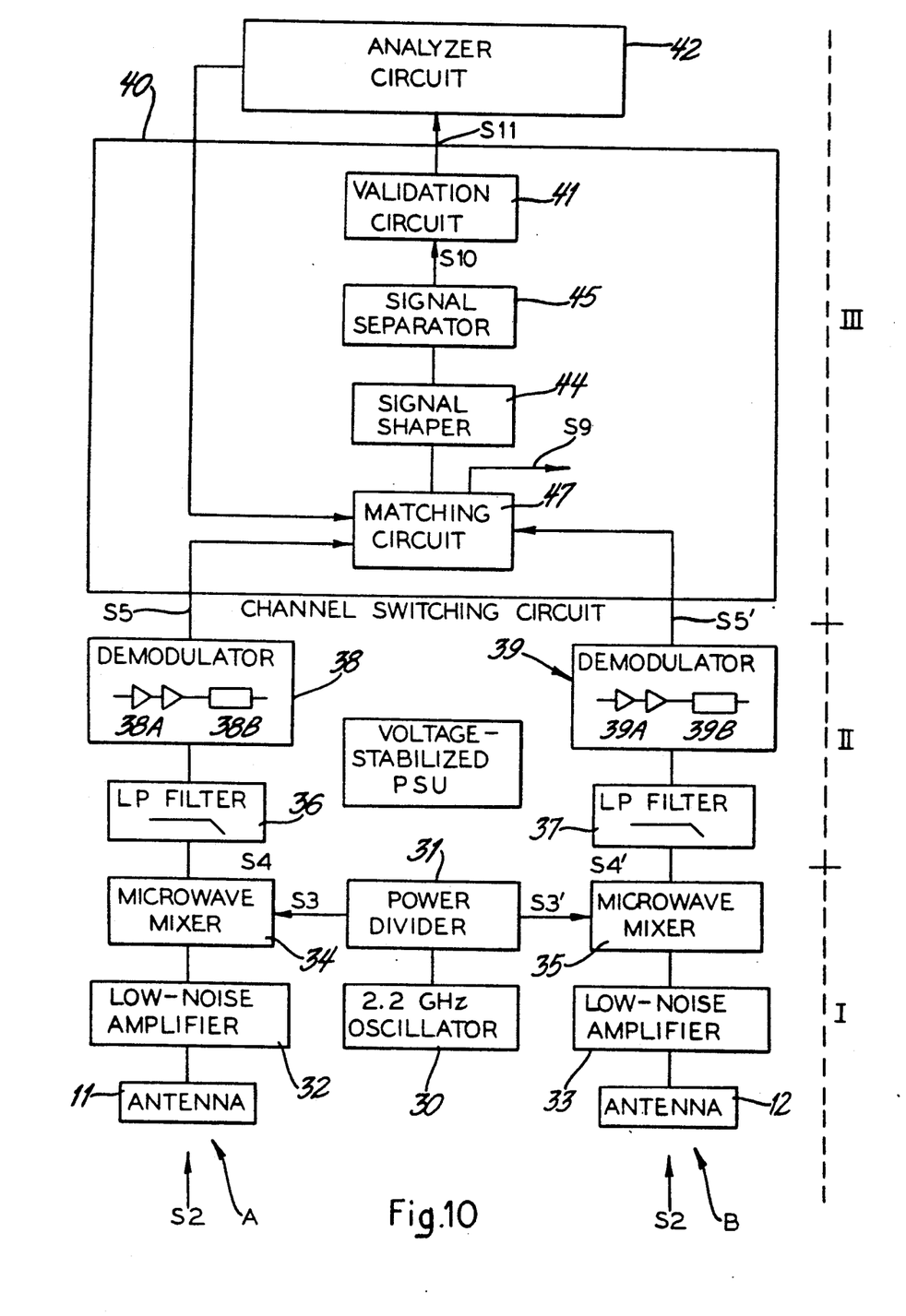
FIG. 10 is a block diagram of an embodiment of the receiver in which the original channel has priority.

It goes without saying that the above description has been given by way of non-limiting example only and that numerous variations thereon could be suggested by one skilled in the art without departing from the scope of the invention. For example, in a simplified version a priority channel is defined. The discrimination circuit tests continuously for the presence of line synchronization signals; provided that the signals are present (at the frequency of 64 μs in this example) the chosen channel is retained. If the synchronization signal is absent, on the other hand, the other channel is tested and if the line synchronization signal is present the system switches to that channel. If this channel deteriorates in turn the system switches back to the priority channel and the process is repeated. FIG. 10 is a block diagram of a discrimination circuit of this kind having a priority channel.

The expression "better reception" used hereinabove does not imply that the degree of picture quality can be replaced, but in practice signifies "good" rather than "bad" (all or nothing criterion).

We claim:

1. A method of transmitting video signals formed by a succession of video picture line signals beginning with a known format synchronization signal of a known period representing a known line synchronization frequency between a transmission area and a reception area, both included in a confined space, comprising the steps of:
   producing a first video signal in the transmission area;
   modulating said first video signal at a carrier frequency in the microwave band to produce microwave transmission signals;
   transmitting said microwave transmission signals from a transmitting antenna directed to the reception area provided with two receiving antennae, each receiving antenna provided on an angularly offset privileged axis with respect to each another;
   receiving separate microwave transmission signals produced by said transmitting step in each of said two receiving antenna;
   processing and demodulating said microwave transmission signals in separate but identified first and second demodulation and processing channels connected to a respective receiving antenna to produce a second video signal in said first demodulation and processing channel and a third video signal in said second demodulation and processing channel;
   connecting said second video signal to a picture forming apparatus;
   detecting, in said first and second demodulation and processing channels, the presence of a periodic signal with a frequency equal to the video line synchronization frequency in said second and third video signals; and
   connecting said third video signal to the picture forming apparatus if said periodic signal is no longer detected in said first demodulation and processing channel, but is detected in said second demodulation and processing channel.

2. The method in accordance with claim 1, further including the step of continuing to detect the presence of said periodic signal in said first and second demodulation and processing channels and connecting either said second video signal or said third video signal to the picture forming apparatus until said microwave transmission signal is no longer received by said two receiving antennas.

3. The method in accordance with claim 1, further including the step of maintaining connection of said second video signal to the picture forming apparatus if no periodic signal at a frequency equal to the video line synchronization frequency is detected in said first and second demodulation and processing channels.

4. The method in accordance with claim 1, further including steps of analyzing and comparing said second and third video signals to determine which of said second and third video signals is better, and connecting said better signal to the picture forming apparatus.

5. The method in accordance with claim 4, wherein said better signal is connected to the picture forming apparatus upon detection of the first next line or the first next frame synchronization signal.

6. The method in accordance with claim 1, wherein said carrier frequency is in the range of between 1 and 30 GHz.

7. The method in accordance with claim 6, wherein said carrier frequency is approximately 2.5 GHz.

8. The method in accordance with claim 1, wherein said confined space is a tunnel acting as a waveguide for transmitting said microwave transmission signals between the transmission area and the reception area.

9. The method in accordance with claim 1, wherein said angular offset is fixed.

10. The method in accordance with claim 1, wherein said angular offset is variable.

11. The method in accordance with claim 9, wherein said angular offset is in the range between 15° and 45°.

12. The method in accordance with claim 10, wherein said angular offset is in the range between 15° and 45°.

13. The method in accordance with claim 11, wherein said angular offset is approximately 20°.

14. The method in accordance with claim 12, wherein said angular offset is approximately 20°.

15. The method in accordance with claim 8, wherein said angular offset is transverse to said tunnel.

16. A system for transmitting video picture line signals beginning with a known format synchronization signal with a known period representing a known line synchronization frequency between a transmission area and a reception area, both included in a confined space, comprising:
   a video recording device producing a first video signal;
   a modulation means connected to said video recording device for modulating said video signal at a carrier frequency in the microwave band to produce microwave transmission signals;
   a transmitter associated with said video recording device and said modulation means for transmitting said microwave transmission signals in the confined space directly to the reception area, said transmitter including a first antenna;
   a receiver means provided in said reception area for receiving said microwave transmission signals, said receiver means including second and third antennae with radiation patterns defining two angularly offset privileged axes;
   first and second demodulation and processing channels, each of which is connected to the output of one of said second and third antennae, respectively, for demodulating said microwave transmission signals received by each of said second and third antennae to produce respective second and third video signals, said first and second demodulation and processing channels detecting the presence or absence of a periodic signal with a frequency equal to the video line synchronization frequency in said second and third video signals, said first and second demodulation and processing channels each producing an output including said second or third video signals and a signal indicating the presence or absence of said periodic signal;
   an analyzer circuit connected to said first and second demodulation and processing channels for receiving said second and third video signals as well as said output indicating the presence or absence of said periodic signal, said analyzer circuit determining the reception quality of said second and third video signal as well as which of said second and third video signals should be displayed, said analyzer circuit producing an output; and
   a display device connected to said analyzer circuit for displaying either said second or third video signal, based upon said output produced by said analyzer circuit.

17. The system in accordance with claim 16 wherein said modulation means includes a microwave amplifier and a microwave oscillator.

18. The system in accordance with claim 16, wherein said output of said analyzer circuit is switched at the start of frame synchronization time.

19. The system in accordance with claim 16, wherein the output of said analyzer circuit is switched at the beginning of line synchronization time.

20. The system in accordance with claim 6, wherein said microwave oscillator oscillates at a frequency of between 1 and 30 GHz.

21. The system in accordance with claim 20, wherein said microwave oscillator oscillates at a frequency of approximately 2.5 GHz.

22. The system in accordance with claim 16, wherein said second and third antennae are identical polarization microstrip antennae disposed in angularly offset planes.

23. The system in accordance with claim 16, wherein said confined space is a tunnel acting as a waveguide between said first antenna and said second and third antennae, said first, second and third antennae being polarized parallel to the larger transverse dimension of said tunnel.

24. The system in accordance with claim 16, wherein said second and third antennae are different rectilinear polarized coplanar microstrip antennae.

25. The system in accordance with claim 23, further including a plane metal reflector provided adjacent to a bend or branch in said tunnel.

26. The system in accordance with claim 25, wherein said transmitter is mobile.

27. The system in accordance with claim 16, wherein said privileged axes of said second and third antennae are offset by a fixed angle of between 15° and 45°.

28. The system in accordance with claim 23, wherein said privileged axes of said second and third antennae are offset by a variable angle of between 15° and 45°.

29. The system in accordance with claim 27, wherein said privileged axes of said second and third antennae are offset by an angle of 20°.

30. The system in accordance with claim 28, wherein said privileged axes of said second and third antennae are offset by an angle of 20°.

31. The system in accordance with claim 16, wherein said confined space is a tunnel extending along the axis of said first antenna and said second antenna and said third antenna are oriented perpendicular to this axis.

32. The system in accordance with claim 17, wherein each of said first and second demodulation and processing channels induces a lower noise microwave amplifier, a microwave mixer receiving a demodulated signal differing from the frequency of said transmitter by an amount representing an intermediate frequency (IF) between 30 and 300 MHz, a low pass filter tuned to said intermediate frequency and a frequency demodulator.

33. The system in accordance with claim 32, wherein said frequency demodulator includes a signal compressor stage and a phase-locked loop demodulator stage.

34. The system in accordance with claim 32, further including a demodulation oscillator and a power divider connected to said demodulation oscillator, said power divider connected to both said first and second demodulation and processing channels.

* * * * *

UNITED STATES PATENT AND TRADEMARK OFFICE
CERTIFICATE OF CORRECTION

PATENT NO. : 5,335,006
DATED      : August 2, 1994
INVENTOR(S): Dominique Charpentier, Pierre Degauque, Daniel Degardin and Jacques Baudet It is certified that error appears in the above-indentified patent and that said Letters Patent is hereby corrected as shown below:

```
Column 5, line 55, delete "impdedance" insert ---- impedance ----.

Column 6, line 62, delete "ledged" insert ---- leged ----.

Column 6, line 64, delete "possiblity" insert ---- possibility ----.

Column 13, line 1, after "16" insert ---- , ----.

Column 13, line 10, delete "6" insert ---- 17 ----.
```

Signed and Sealed this

First Day of November, 1994

Attest:

BRUCE LEHMAN

Attesting Officer  Commissioner of Patents and Trademarks